(12) United States Patent
DuRant et al.

(10) Patent No.: US 6,802,441 B1
(45) Date of Patent: Oct. 12, 2004

(54) PIGGYBACK TOOL CARRIER

(75) Inventors: Michael DuRant, 30 Flint Gulch, Lyons, CO (US) 80540; Reginald W. Flagg, Anna Maria, FL (US)

(73) Assignee: Michael DuRant, Lyons, CO (US)

(*) Notice: Subject to any disclaimer, the term of this patent is extended or adjusted under 35 U.S.C. 154(b) by 0 days.

(21) Appl. No.: 10/079,742

(22) Filed: Feb. 19, 2002

Related U.S. Application Data

(60) Provisional application No. 60/269,759, filed on Feb. 16, 2001.

(51) Int. Cl.[7] .................................................. B60R 9/00
(52) U.S. Cl. ........................................ 224/513; 224/521
(58) Field of Search ................................ 224/513, 514, 224/519, 521

(56) References Cited

U.S. PATENT DOCUMENTS

| | | | |
|---|---|---|---|
| 4,593,840 A | * 6/1986 | Chown | ........................ 224/520 |
| 4,744,590 A | * 5/1988 | Chesney | ...................... 280/769 |
| 4,813,584 A | 3/1989 | Wiley | |
| 5,029,740 A | * 7/1991 | Cox | ........................... 224/484 |
| 5,038,983 A | 8/1991 | Tomososki | |
| 5,310,100 A | * 5/1994 | Liscinsky | .................... 224/487 |
| 5,427,289 A | * 6/1995 | Ostor | .......................... 224/499 |
| 5,460,304 A | 10/1995 | Porter et al. | |
| 5,586,702 A | 12/1996 | Sadler | |
| 5,699,985 A | * 12/1997 | Vogel | .......................... 224/564 |
| 5,775,560 A | 7/1998 | Zahn et al. | |
| 5,881,937 A | 3/1999 | Sadler | |
| 6,105,843 A | 8/2000 | Dollesin | |
| 6,260,752 B1 | 7/2001 | Dollesin | |
| 6,502,730 B2 | * 1/2003 | Johnson | ...................... 224/519 |
| 6,575,155 B2 | * 6/2003 | Brennan | ................... 126/41 R |

* cited by examiner

*Primary Examiner*—Stephen K. Cronin
(74) *Attorney, Agent, or Firm*—Rick Martin; Patent Law Offices of Rick Martin, P.C.

(57) ABSTRACT

A piggyback carrier designed for the safe and economical transporting of a container piggybacked to the back or front of a vehicle. Specifically, the piggyback is designed to be attached to the container and to support the container during transportation. The piggyback carrier can be adjusted and may be fitted to most vehicles having conventional type hitches. A left and a right jack is removably attached to each side of the frame of the carrier to enable one man to jack up a heavy cargo, roll it to the vehicle and mount the frame to the hitch on the vehicle.

16 Claims, 3 Drawing Sheets

PIGGYBACK TOOL CARRIER

CROSS REFERENCE APPLICATIONS

This application is a non-provisional application claiming the benefits of provisional application No. 60/269,759 filed Feb. 16, 2001.

FIELD OF INVENTION

Generally the invention relates to a carrier designed primarily for the safe and economical transport of containers piggyback on vehicles. The piggyback carrier can be adjustable and may be designed to fit most vehicles having conventional type hitches.

BACKGROUND OF THE INVENTION

A significant problem with transporting containers can be that the size of the container may be too large to fit into the type of vehicle typically owned or used. This may necessitate the use of a larger vehicle than desired even when the container is infrequently transported.

Another significant problem with transporting containers can be that the weight of the container may be too heavy to lift into the vehicle or to a piggyback position. This may require the use of additional labor or machinery to lift the container into the vehicle or into a piggyback position.

Another significant problem with transporting containers may be that the containers can shift in the vehicle causing distraction to the driver, instability with respect to the tracking of the vehicle, or damaging the vehicle or the hitch.

The present invention addresses each of the above-mentioned problems in a practical fashion. It also satisfies a long-felt but unresolved need to provide piggyback transport of containers, such as toolboxes, wherein a loaded cargo box weighing hundreds of pounds can be jacked up with a left and a right jack by one man, then rolled into the receiving hitch under the rear bumper of a vehicle.

Accordingly, the broad aspect of the invention can be to provide a piggyback carrier device and provide piggyback carrying techniques for transport of containers on a variety of vehicles.

SUMMARY OF THE INVENTION

A significant aspect of the invention can also be to provide a manner of lifting containers into the piggyback position on vehicles without having to use an undesired additional labor or machines.

Another significant aspect of the invention can be to provide stabilization elements which minimize the shifting of containers in the piggyback position.

Other aspects of this invention will appear from the following description and appended claims, reference being made to the accompanying drawings forming a part of this specification wherein like reference characters designate corresponding parts in the several views.

A piggyback carrier for containers, including toolboxes and the like, can be used in numerous applications including using a Class 3 hitch in front or in the rear of a vehicle to hold a removable frame.

A frame is designed to support a container, or toolbox, or the like, during transport. It can provide a manner of attaching the toolbox to a vehicle for transport and remove it when not in transport. It can also include fittings at each end for removable jacks. It can also have fittings at each end for adjustable stabilizer bars. It can have a receiver tube permanently attached to the center. The frame is meant to be attached to the toolbox with four bolts.

An adjustable receiver tube can be designed to attach the frame-mounted container to the vehicle's receiver hitch. The tube has one hole in the end that fits into the vehicle's receiver hitch and is secured by means of a locking pin. The other end has several holes and is used for attaching the frame-mounted container or toolbox to the adjustable receiver tube. The multiple holes provide adjustability which may be necessary for use with different vehicles. A locking pin can be used to secure the frame-mounted toolbox to the adjustable receiver tube.

The two removable jacks fit on each end and can be used to raise and lower the frame-mounted container, such as a toolbox, while it is being attached or removed from the vehicle. The removable jacks can be removed once the frame-mounted toolbox is secured to the vehicle.

The two adjustable jack feet fit onto the shaft of each removable jack and provide stability while the frame-mounted container, which can be a toolbox, is being raised and lowered. They can have multiple mounting holes to adjust to the different heights required to attach the frame-mounted toolbox to different vehicles. They can also have casters to help make attaching of the frame-mounted toolbox to the vehicle faster, safer, and easier.

The two adjustable stabilizer bars can be designed to fit at each end of the frame and may provide extra support by means of providing a stable adjustable contact point between each end of the frame and vehicle's bumper. They may inhibit load shifting while frame-mounted toolbox is in transport.

As can be easily understood from the foregoing, the basic concepts of the present invention may be embodied in a variety of ways. It involves both piggyback carrier techniques as well as devices to accomplish piggyback carrying of containers with vehicles. In this application, the piggyback carrier techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but can be varied in a number of ways. Importantly, as to all of the foregoing, all of these facets should be understood to be encompassed by this disclosure.

The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

It should also be understood that a variety of changes may be made without departing from the essence of the invention. Such changes are also implicitly included in the description. They still fall within the scope of this invention.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "piggyback carrier" should be understood to encompass disclosure of the act of "piggyback carrying", such a disclosure should be understood to encompass disclosure of a "piggyback carrier" and even a means for "piggyback carrying". Such changes and alternative terms are to be understood to be explicitly included in the description.

In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition, are hereby incorporated by reference Thus, the applicant(s) should be understood to claim at least: i) each of the piggyback carrying devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown a separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

Before explaining the disclosed embodiment of the present invention in detail, it is to be understood that the invention is not limited in its application to the details of the particular arrangement shown, since the invention is, capable of other embodiments. Also, the terminology used herein is for the purpose of description and not of limitation.

DETAILED DESCRIPTION OF THE DRAWINGS

Figure 1:
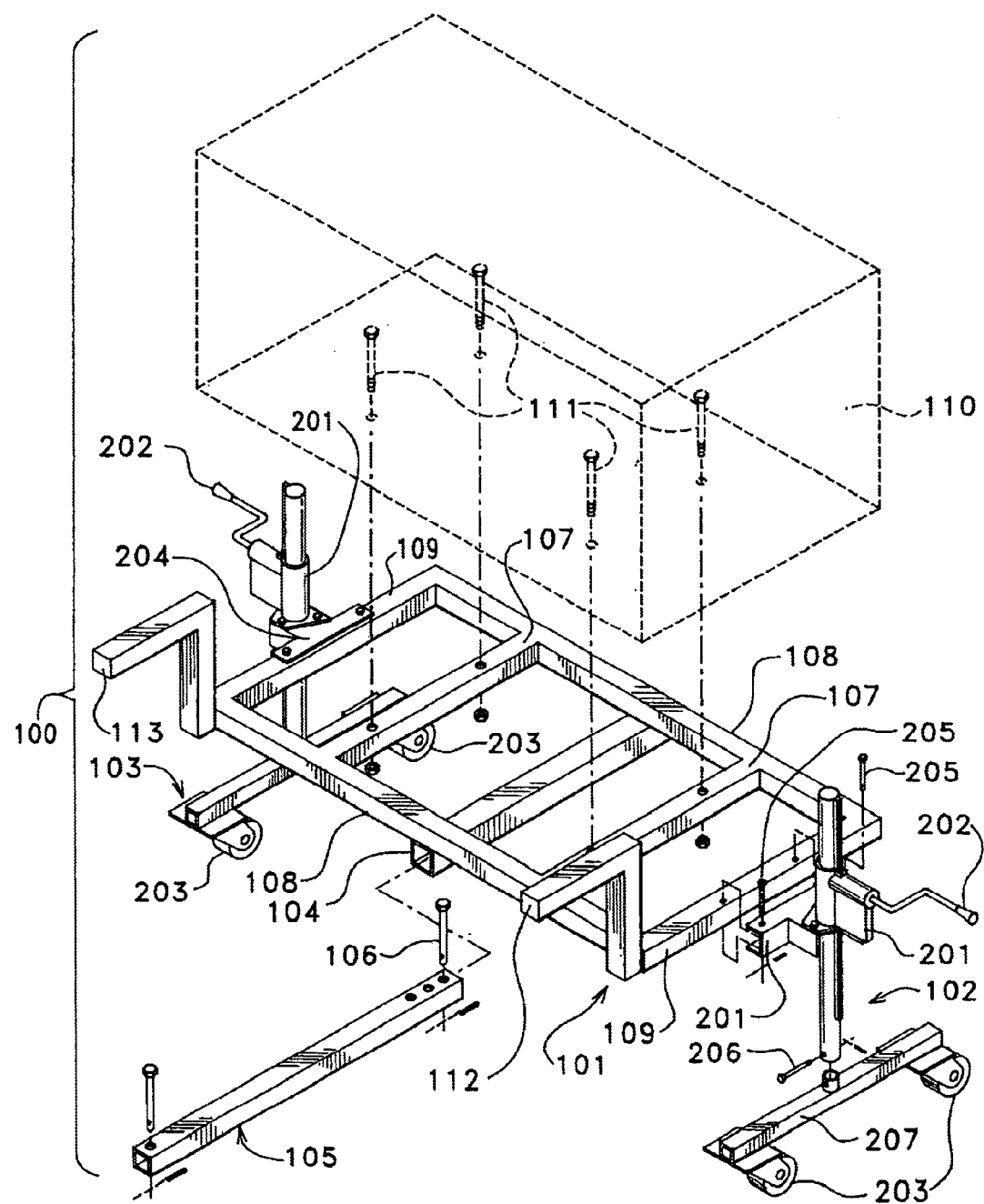
FIG. 1 is an exploded view of the preferred embodiment of the present invention.

Referring first to FIG. 1, the cargo carrier 100 had a frame 101, a left and right jack assembly, 102, 103 and a trailer hitch connector 104. The trailer hitch connector 104 is adapted to receive a removable hitch shaft 105 which is sized to fit into a standard vehicle hitch connector (not shown). The hitch shaft 105 is removably attached to the trailer hitch connector 104 with a locking pin 106 or any similar type of locking mechanism. Trailer hitch connector 104 and the hitch shaft 105 can alternately be formed as one piece. The hitch shaft 105 attaches to the vehicle hitch connector in a know manner.

The frame 101 has crossbeams 107, frame members 108 and side frame members 109 and is preferably made from square steel tubing. The exact size and shape of the frame 101 and the number of crossbeams 107 will depend on the size and shape of the cargo carrier 110 to be mounted on the frame. The frame 101 can also have a left and right stabilizer bar 112, 113 attached to prevent load shift. The cargo carrier 110 can be a box, tool box, or any other desired container. The cargo container 110 can be removably mounted to the frame with screws 111, as shown, or alternatively the cargo container could be strapped to the frame 101 using cargo straps in known manner not shown. The cargo container 110 could be a preexisting box or a custom made box designed to go with a specific frame or job.

Figure 2:
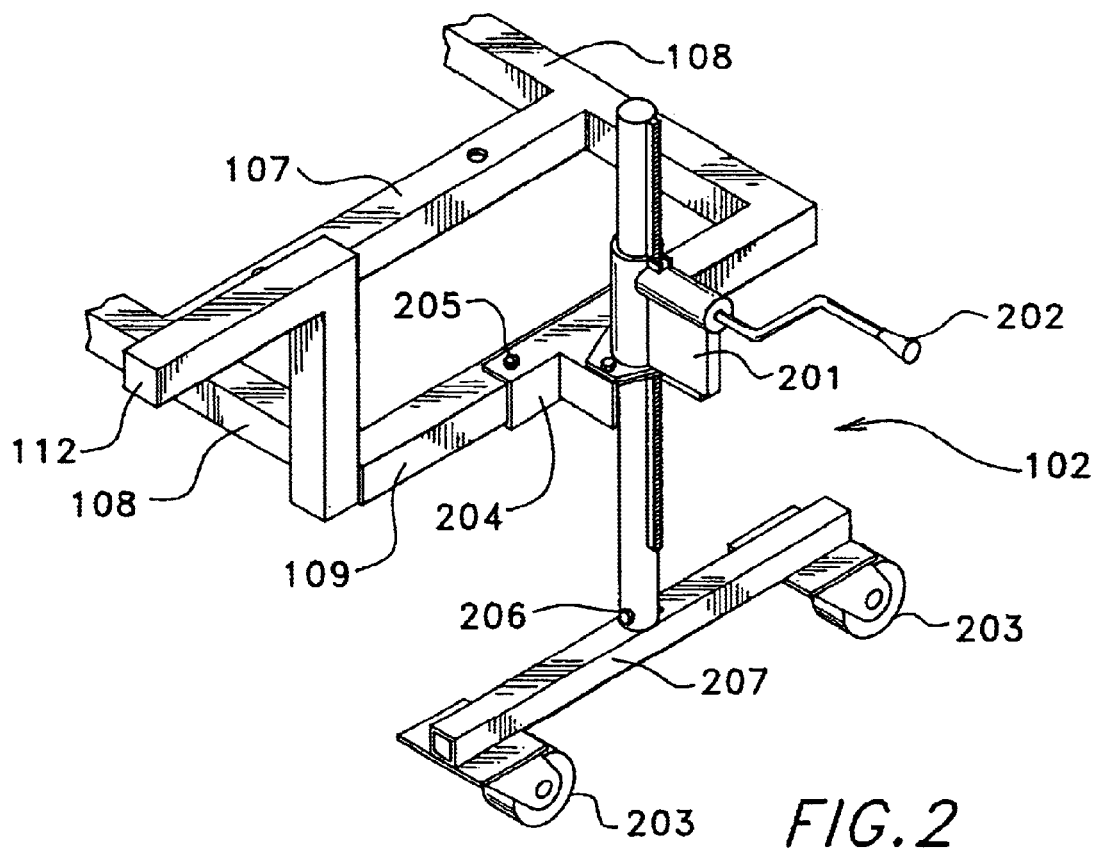
FIG. 2 is a perspective view of the preferred embodiment of the jack assembly of the present invention.
Figure 3:
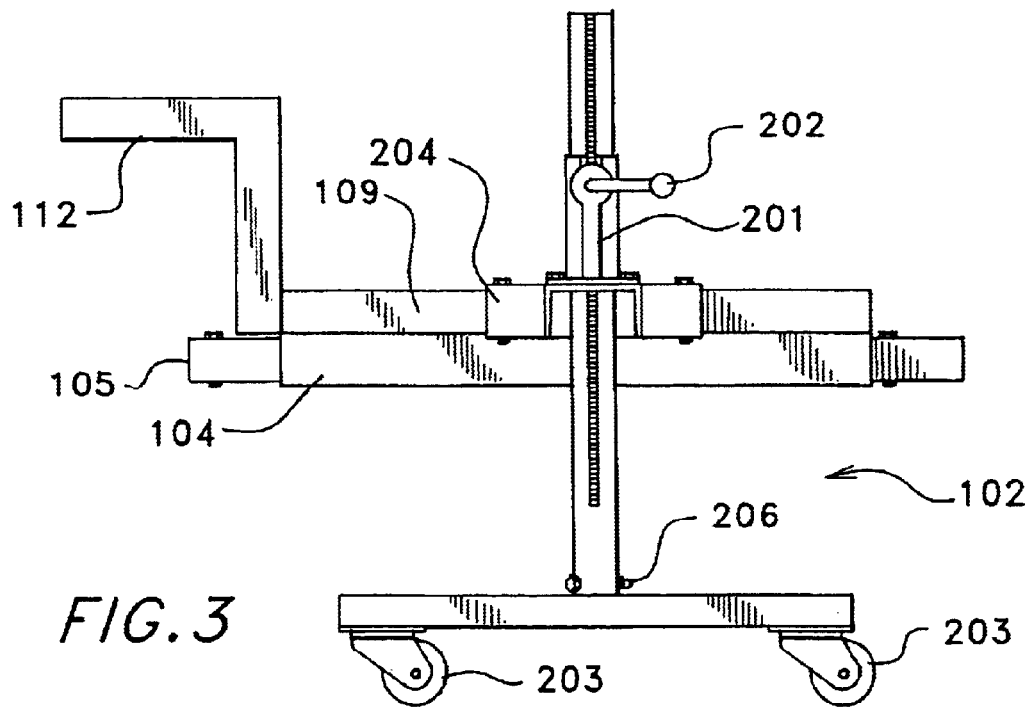
FIG. 3 is a side view of the jack assembly shown in FIG. 2.
Figure 4:
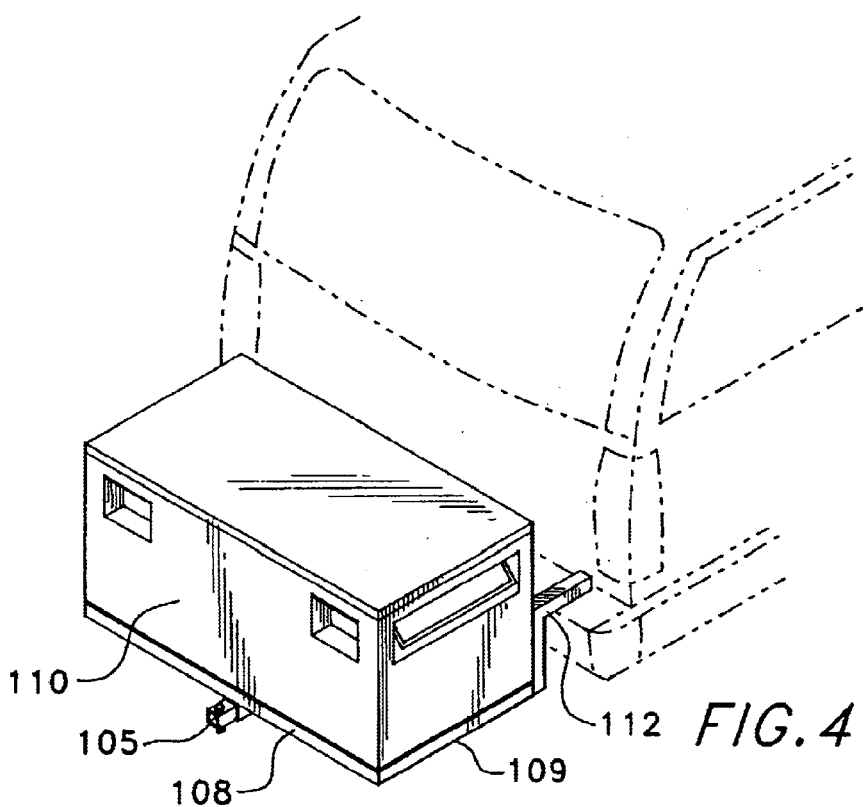
FIG. 4 is a perspective view of the present invention mounted on the back of a vehicle.

As shown in FIGS. 2 and 3, the preferred embodiment of the jack assemblies 102, 103 removably attaches to the side members 109. The jack assembly 102 has a riser body 201. The riser body 201 has a handle 202 and functions in a known manner to allow the user to raise and lower the frame 101 to the desired height. The jack assemblies 102, 103 can be provided with wheels 203 to allow the entire assembly 100 to be easily moved. The jack assemblies 102, 103 are removably attached to the frame 101 on the side frame members 109 with a bracket 204. The bracket 202 shaped to fit over side frame member 109 and is longitudinally aligned with the frame 101 to allow the bracket 204 to fit over the side frame members 109. The bracket 202 is secured to the side frame members 109 with a locking pin 205 or other known locking mechanism. This allows the jack assemblies 102, 103 to be removed from the cargo carrier 100 once the frame is attached to the vehicle as shown in FIG. 4.

Figure 5:
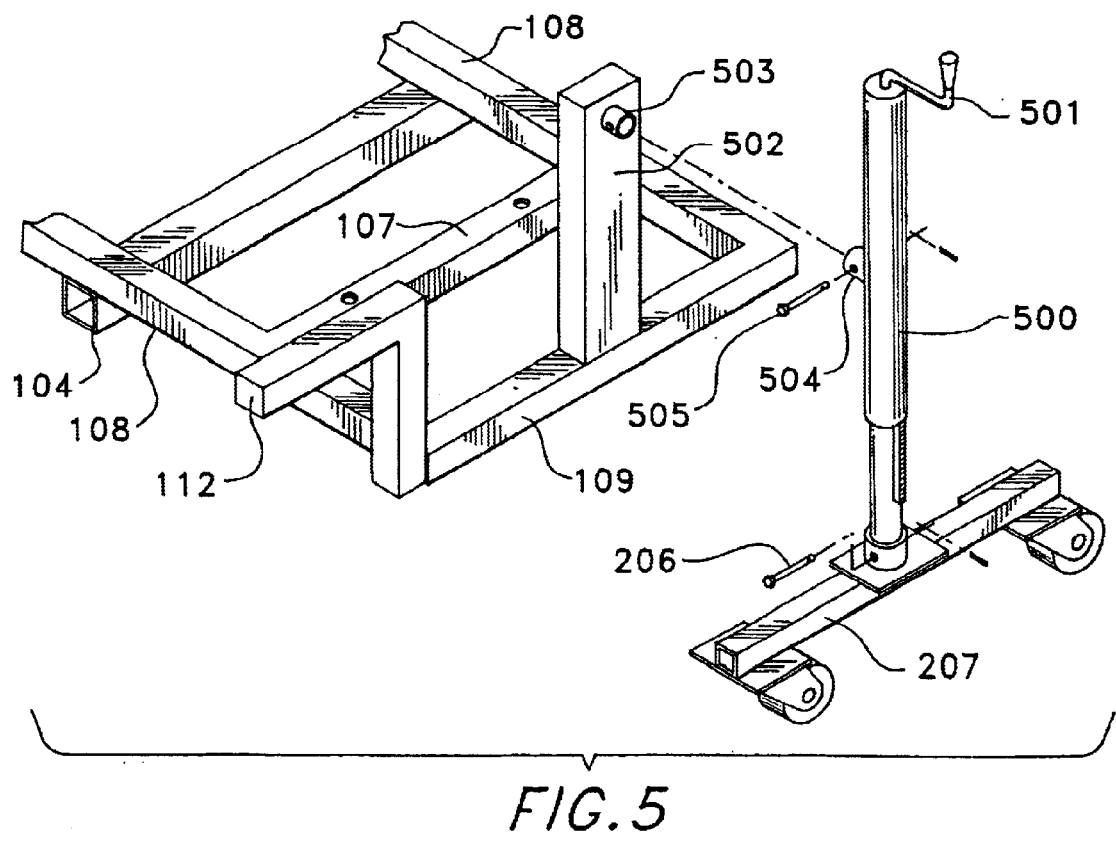
FIG. 5 is an exploded view of an alternate embodiment of the jack assembly.

In an alternate embodiment of the present invention shown in FIG. 5, jack assembly 500 with a top mounted handle 501 and a female connector 504 on one side is used. The frame 101 has a vertical column 502 with a male connector which is adapted to receive the male connector 503 on the vertical column 502. The connectors 503 and 504 are secured together with a locking pin 505 or other known locking mechanisms.

In both embodiments of the jack assemblies, the riser body is attached to a base 205, which holds the wheels 203. The riser bodies can be removably attached to the base 202 with a locking pin 206 as shown in FIGS. 1 and 5.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A cargo carrier comprising:
a frame having a front edge with a trailer hitch connection;
a left and a right jack assembly;
each said jack assembly having a riser body; and said frame having a left and a right edge each having a jack connecter assembly for removable attachment to the respective riser body.

2. The cargo carrier of claim 1, wherein the left and right jack assemblies each have a caster, thereby enabling the jack assemblies to be connected to the frame and to roll the frame in and out of a vehicle's receiving hitch.

3. The cargo carrier of claim 1, wherein the frame front edge further comprises a left and right stabilizer bar protruding forward for contact with a vehicle bumper.

4. The cargo carrier of claim 1, wherein the jack connector assembly of each of said edges further comprises a vertical column mounted to the left and the right edge of the frame, said vertical column having a male connector to receive a female connector on a left and a right jack assembly.

5. The cargo carrier of claim 1 wherein the jack connector assemblies each comprise a bracket longitudinally alignable with the respective left and right edge of the frame, said bracket having a quick disconnect mechanism to the frame edge.

6. The cargo carrier of claim 3, wherein the left and right jack assemblies each further comprise a caster.

7. The cargo carrier of claim 3, wherein the trailer hitch connection further comprises a removable male hitch shaft which is adapted to fit into a vehicle hitch, and the frame further comprising a receiving hitch tube, thereby enabling the male hitch shaft to be connected to the vehicle hitch and then receive the receiving hitch tube in a loading operation of the frame onto the vehicle.

8. The cargo carrier of claim 5, wherein each quick disconnect mechanism is a locking pin received thru both the frame and the bracket.

9. The cargo carrier of claim 8, wherein the frame further comprises a square tube construction, and the bracket has a C shape to engage a side of the square tube.

10. A cargo carrier comprising:
a frame having a front edge with a trailer hitch connection; and
said frame having a left and a right edge each with a removable connector for
removable attachment to a jack.

11. A cargo carrier comprising:
a frame having a front edge with a trailer hitch connection;
a left and a right jack assembly;
each said jack assembly having a riser body;
said frame having a left and a right edge each having a jack connector assembly for removable attachment to the respective riser body; and
wherein the jack connector assemblies each comprise a bracket longitudinally alignable with the respective left or right edge of the frame, said bracket having a quick disconnect mechanism to the frame edge.

12. A cargo carrier comprising: a frame having a front edge with a trailer hitch connection; a left and a right jack assembly; each said jack assembly having a riser body; said frame having a left and a right edge each having a jack connector assembly for removable attachment to the removable attachment to the respective riser body; and wherein the jack connector assembly further comprises a vertical column mounted to the left and the right edge of the frame, said vertical column having a male connector to receive a female connector on the jack assembly.

13. A cargo carrier comprising; a frame means functioning to support a cargo box; said frame means having a front edge with a trailer hitch means functioning to connect to a vehicle hitch; a left and a right jack assembly means, said left and right jack assembly means each functioning to lift the frame means to a level for mounting to the vehicle hitch; said frame means having a left and a right edge means each having a jack connector means functioning to removably connect to each of said left and right jack assembly means.

14. The cargo carrier of claim 13, wherein the left and the right jack assembly means each further comprise a wheel means functioning to enable the frame and cargo box to be rolled to and from the vehicle hitch.

15. The cargo carrier of claim 14, wherein the trailer hitch means further comprises a removable male hitch shaft means functioning to attach to the vehicle hitch and to a frame female shaft receiver, thereby enabling the cargo box and frame to be rolled into the removable male hitch shaft when it is mounted to the vehicle hitch.

16. The cargo carrier of claim 15 wherein the front edge further comprises a left and a right stabilizer means functioning to contact the vehicle under load and reduce movement of the frames means.

* * * * *